F. L. O. WADSWORTH.
ROTARY BORING DRILL.
APPLICATION FILED MAY 26, 1919.

1,374,867.

Patented Apr. 12, 1921.
5 SHEETS—SHEET 1.

F. L. O. WADSWORTH, Inventor

By His Attorney Jesse R. Stone

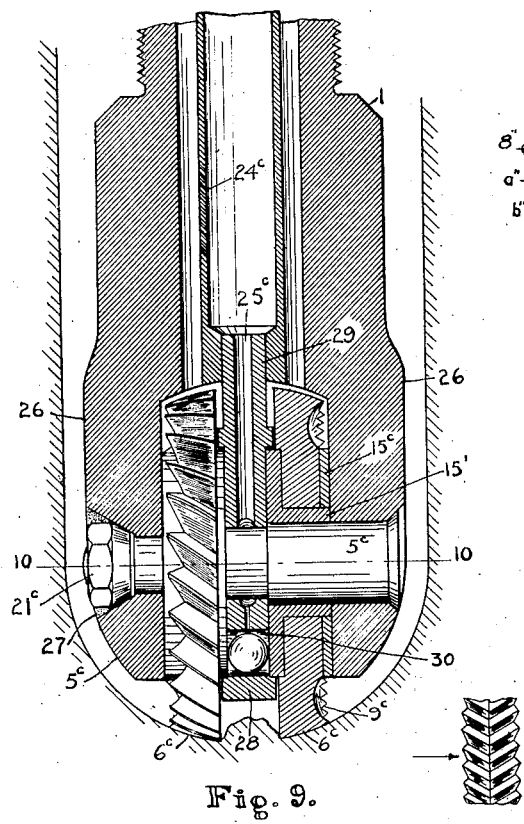
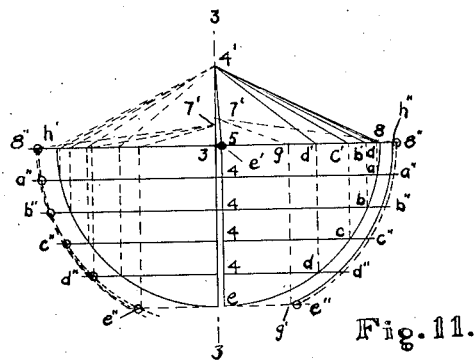
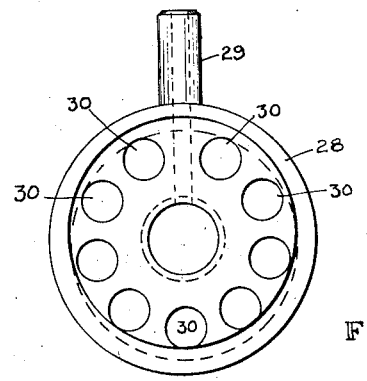
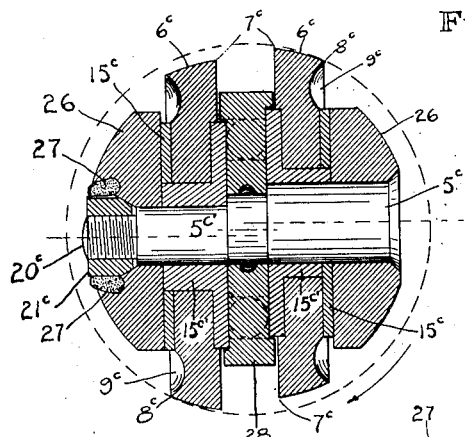
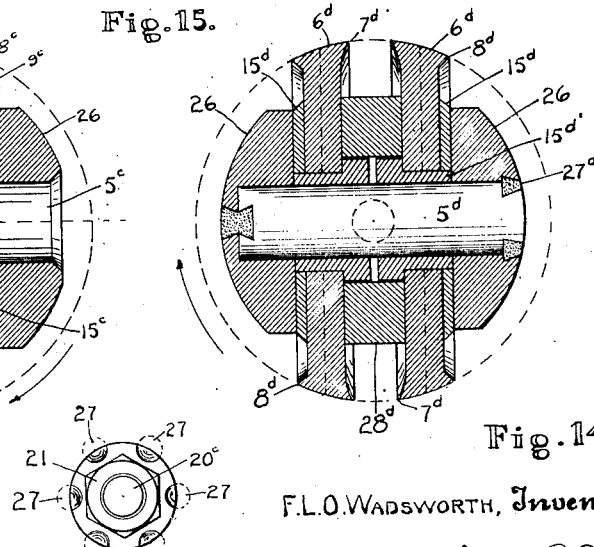

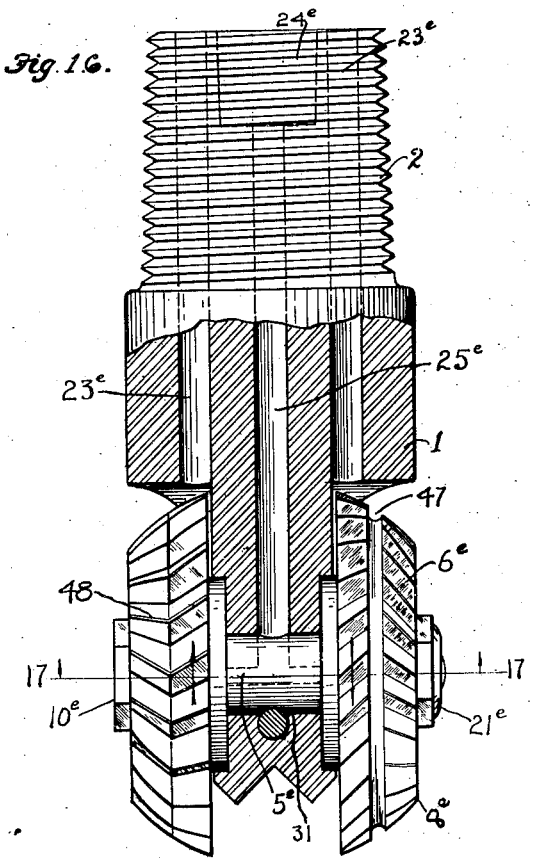
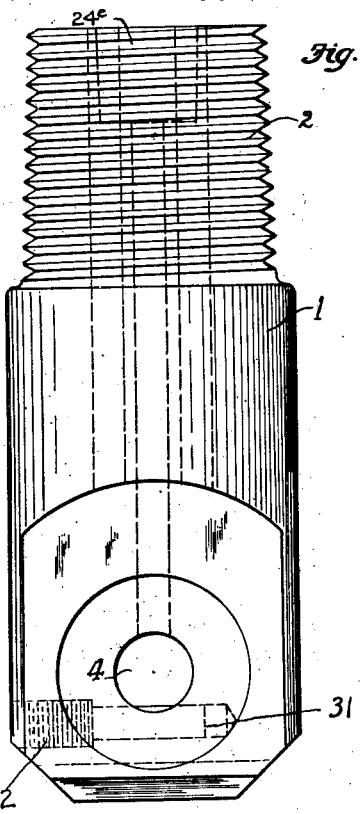
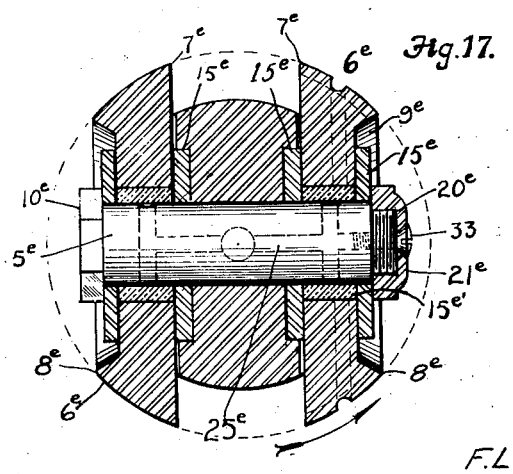
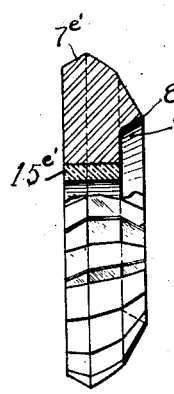

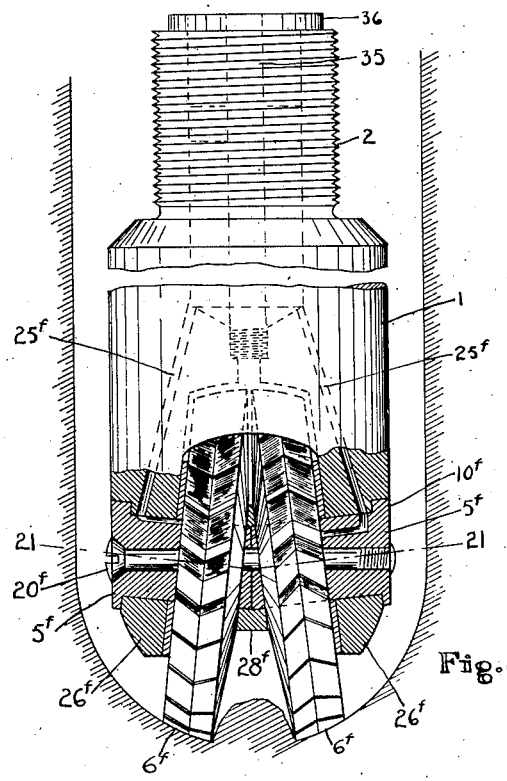
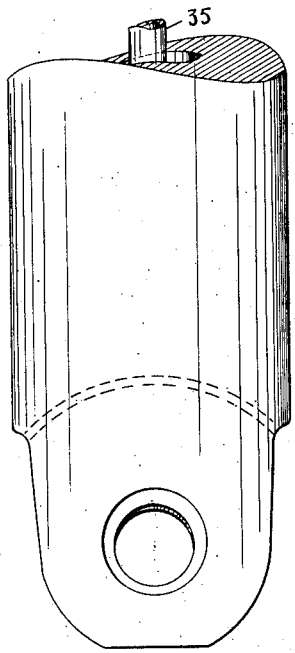
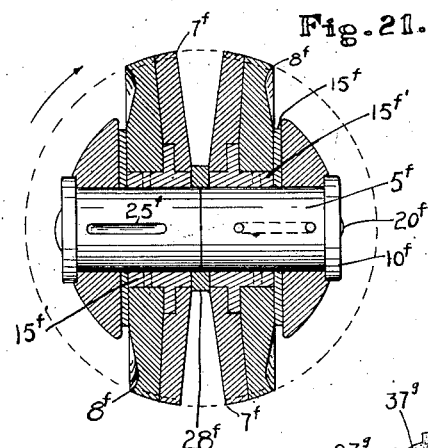
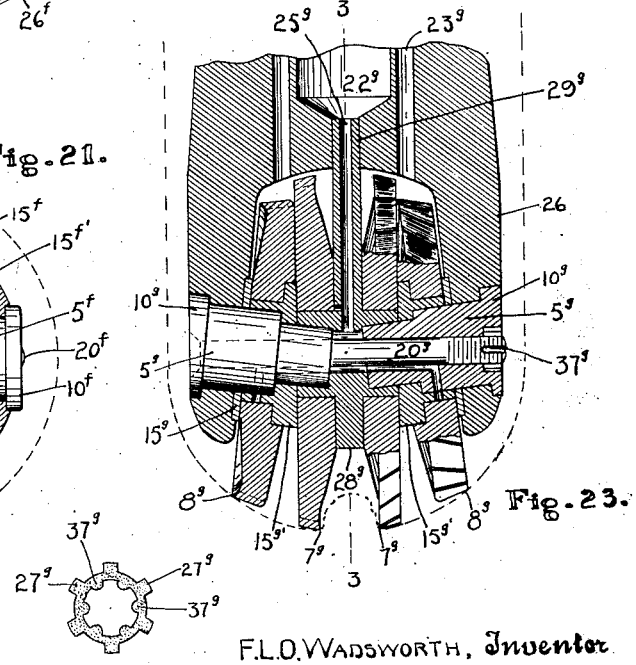

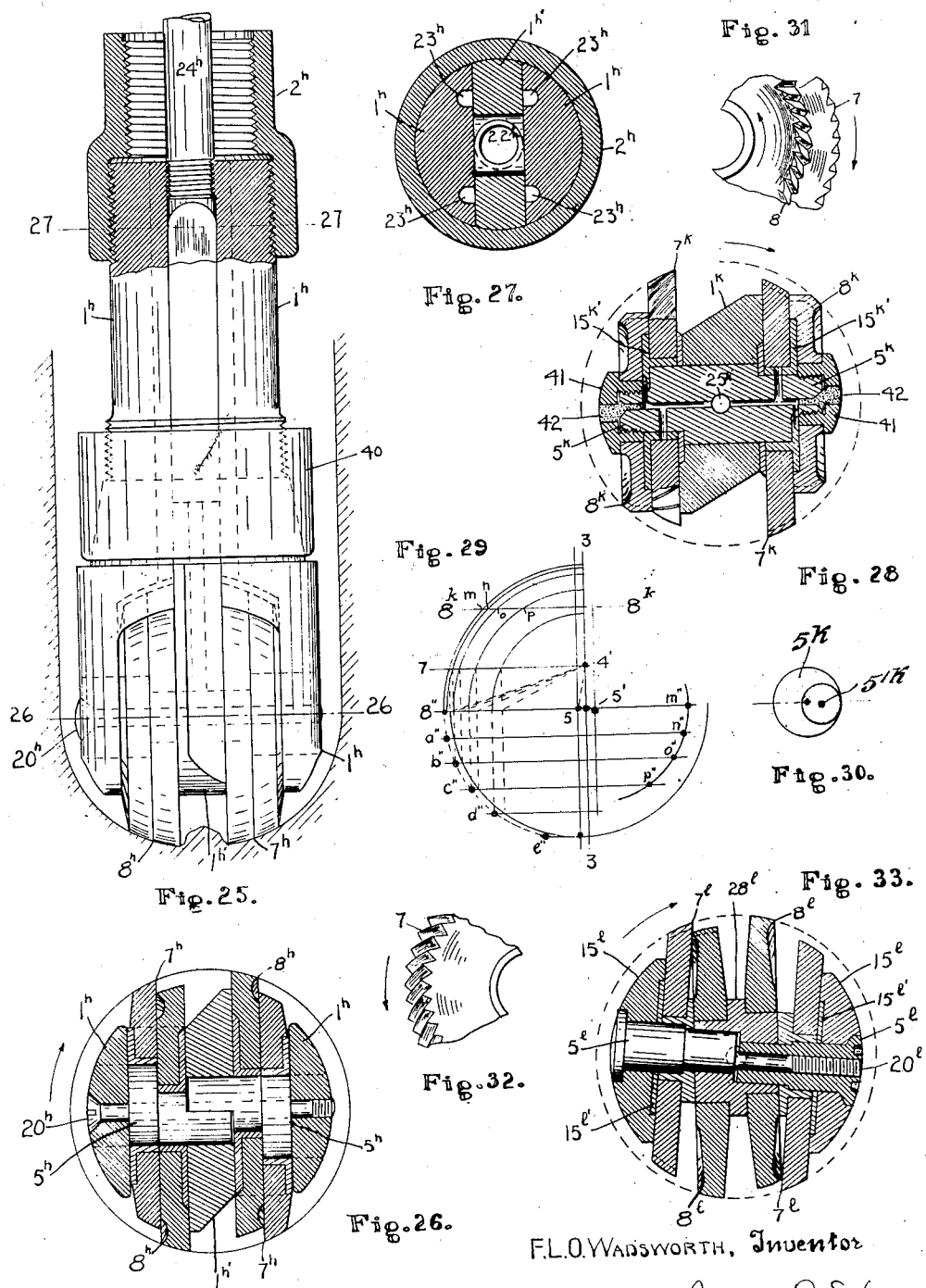

UNITED STATES PATENT OFFICE.

FRANK L. O. WADSWORTH, OF PITTSBURGH, PENNSYLVANIA.

ROTARY BORING-DRILL.

1,374,867.  Specification of Letters Patent.  Patented Apr. 12, 1921.

Application filed May 26, 1919. Serial No. 300,004.

*To all whom it may concern:*

Be it known that I, FRANK L. O. WADSWORTH, a citizen of the United States, residing at Pittsburgh, Pennsylvania, have invented a certain new and useful Improvement in Rotary Boring-Drills, of which the following is a full, clear, and exact description, such as will enable others skilled in the art to which it appertains to make and use the same.

My invention relates to improvements in rotary boring drills for use in boring oil or water wells, tunnels, etc. It contemplates the provision of a bit composed of a head threaded at the rear or upper end for attachment to a rotary drill stem and provided at its forward end with cutters for the drilling operation. The cutters are disk shaped and mounted to rotate on an axis transverse to the longitudinal axis of the head. The matter disintegrated by the drill is washed away from the cutters and carried to the surface by a stream of flushing water introduced under pressure through the hollow drill stem and through channels in the head of the bit.

One object of my invention is to mount the cutters of a disk bit in such manner as to insure both a cutting and disintegrating action as the drill is operated.

Another object is to so mount the cutters as to perform the cutting operation at the rear or following edge of the disk.

Another object is to provide the teeth of the cutters in such form as to insure the ready rotation of the cutting disks on their axes as the drill is operated.

Another object is to perform the cutting in such manner as to direct the side thrust, due to the cutting strain, toward the bearing instead of away therefrom as is now commonly done with this type of cutters.

Another object is the provision of a novel form of cutting edge on the rearward following periphery of the cutter.

Another object is the provision of novel bearing supports for the rotatable cutters.

Other objects and advantages of my improvement will more clearly appear in the description which follows and will be more particularly pointed out in the claims.

The drawings illustrate three species of disk drill constructions—each illustrated by two or more forms or modifications—all of which embody the more important features of the invention.

Figure 1:
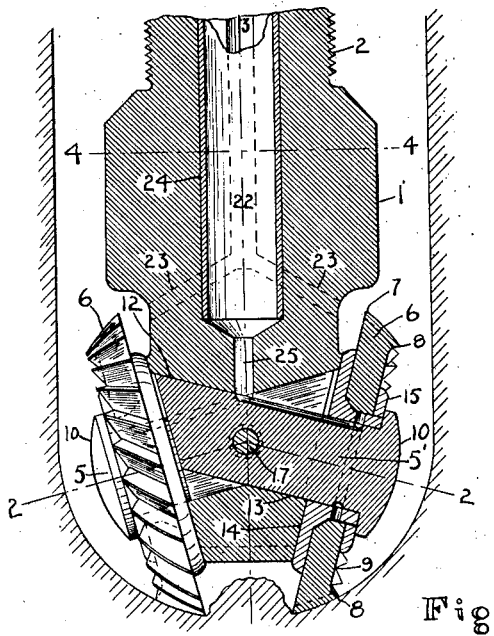
Figure 4:
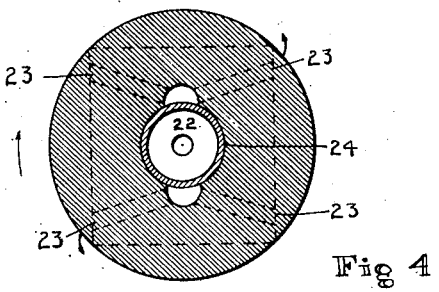
Figure 6:
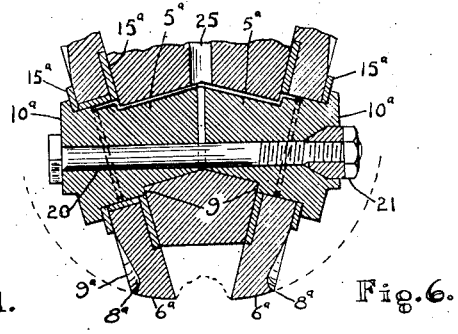
Figure 2:
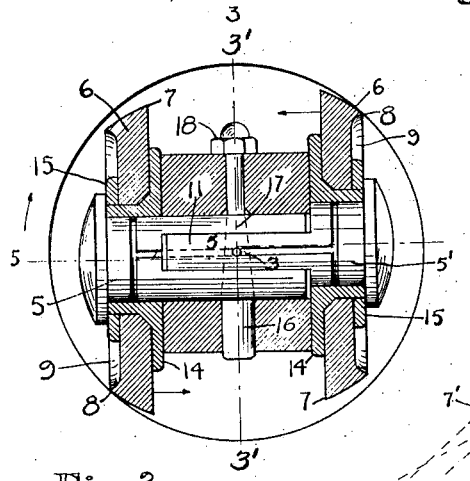
Figure 7:
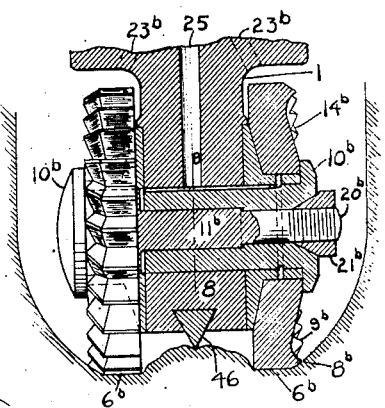
Figure 5:
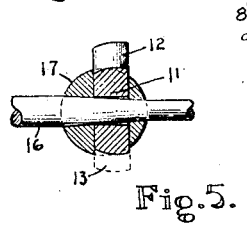
Figure 3:
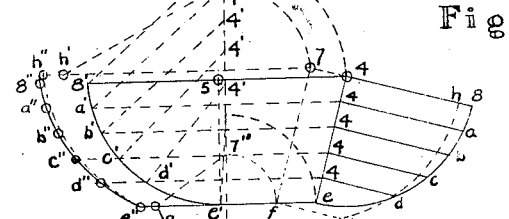
Figure 8:
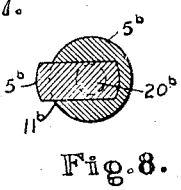

Figure 1 is a longitudinal central section through the head of one of the above enumerated species of drill construction (one of the disk members of the said drill being shown in elevation); Fig. 2 is a plan sectional view on the bent plane 2—2 of Fig. 1; Fig. 3 is a diagram illustrating the method of determining the cross-sectional form of the cavity cut by the rotating drill disks; Fig. 4 is a cross-sectional view through the drill head on the line 4—4 of Fig. 1; Fig. 5 is a detail sectional view on the vertical plane 5'—5' of Fig. 2; Fig. 6 is a partial longitudinal sectional view of the lower end of the drill head, illustrating a modification of the construction shown in Fig. 1; Fig. 7 is a similar view illustrating a second modification of the forms illustrated in Figs. 1 to 6, one cutter being shown in elevation; Fig. 8 is a partial sectional view on the line 8—8 of Fig. 7; Fig. 9 is a longitudinal section (similar to that of Figs. 1, 6 and 7) illustrating a further modification of the construction; Fig. 10 is a plan sectional view on the line 10—10 of Fig. 9; Fig. 11 is a diagram similar to the diagram of Fig. 3; Fig. 12 is a side view of the central member of the construction shown in Figs. 9–10; Fig. 13 is an end view of the central bearing pin of this construction showing the means for locking the same in position.

Fig. 14 is a plan sectional view through the disk axis of a second species of drill structure embodying the invention; Fig. 15 is an elevation of one edge of the disk member of Fig. 14; Fig. 16 is a longitudinal central view, partly in section, of a second modification of the species of Fig. 14; Fig. 17 is a plan sectional view on the line 17—17—viewed in this case from below—of Fig. 16; Fig. 18 is a side elevation of the drill head of Figs. 16 and 17; Fig. 19 is a side elevation—in part sectional—of a modified form of one of the disk cutters for use with this construction; Fig. 20 is a side elevation (partly in section) of a further modification of the species of Figs. 14 and 16; Fig. 21 is a plan sectional view on the bent plane 21—21 of Fig. 20; Fig. 22 is a side elevation of the drill head of Figs. 20 and 21; Fig. 23 is a longitudinal vertical section through the center of a drill head illustrating the third modification of this second species of drill construction; and Fig. 24 is an end view of the bearing pin of the construction of Fig. 23, illustrating a means of locking the pin in place.

Fig. 25 is a side elevation of a third species of drill construction embodying the invention; Fig. 26 is a plan sectional view on the line 26—26 of Fig. 25; Fig. 27 is a cross sectional view on the line 27—27 of Fig. 25; Fig. 28 is a section, similar to that of Fig. 26, illustrating the second modification of this third species of construction; Fig. 29 is a diagram illustrating the method of determining the form of cavity cut by the drill head construction of Fig. 28, and of determining the proper relative location of the axes of the disk members of that construction. Fig. 30 illustrates in end view of the cutter shaft shown in Fig. 28 illustrating the positioning of the disk axes as thus determined from the diagram of Fig. 29; Fig. 31 is a partial side elevation of the face of two of the disk cutters show in Fig. 28; Fig. 32 is a partial side elevation of another portion of these disk cutters; and Fig. 33 is a sectional plan view, similar to the views of Figs. 26 and 28, illustrating a third modification of the third species of construction.

Like numerals and reference characters are used to indicate like parts throughout the description of the above enumerated forms of construction.

Generally described the drill structures embodying the invention comprise a head 1, which is threaded at its upper end—as at 2—for attachment to a hollow drill stem, that serves both to communicate rotary movement to the drill head and also to supply a current of water to the end of the cavity in which the drill head is operated, said head carrying at its lower end two disk members 6, 6, that are rotatably mounted on shaft supports, 5, 5', arranged transversely to the longitudinal axis of the head. In all cases the drill head is rotated in a right handed direction—clockwise as indicated by the arrows in the plan views of Figs. 2, 10, 14, 21, 25, 28 and 33, or counter clockwise as viewed from below in the plan view of Fig. 17,—and in operation the weight of the revolving parts is supported, in whole or in part, by the engagement between the lower faces of the disk members 6, 6ª, etc., and the bottom of the cavity which is being cut by the rotary movement of the drill. By virtue of this engagement the disk members 6, 6ª, etc., are rotated on their shaft supports 5, 5', in a counter clockwise direction—as viewed from the outer ends of these shafts—as the drill head revolves on its longitudinal axis. Each disk member thus presents, in operation, what is ordinarily termed a forward advancing edge 7, and a rearward following edge 8; and in the above described movement of the drill parts the forward advancing edges 7, 7, roll downwardly toward the bottom of the bore cavity, and the rearward following edges 8, 8, roll upwardly with respect to the bore cavity. In a majority of the ordinary types of the disk drill construction the disk cutters are so mounted on the drill head that only the forward advancing edges of the said cutters are in engagement with the bottom and side wall of the hole, and the material is removed by the shearing or scraping action of these sharp advancing edges as they roll forwardly and downwardly in the revolving movement of the drill head. In the various types of construction embodying the present invention the disk members are so positioned on the head that the rearward following edges 8, 8 of the disk members engage with the material; and these edges are so shaped—as shown in the various plan views of the drawings—as to present sharp cutting faces that act to shear away the material with which they are in engagment as the edges roll outwardly and upwardly from the bottom of the bore cavity. As a result of this positioning of the cutting edges of the disk members, the lines of thrust, or of reaction to the cut, on the rear edge are directed inwardly toward the axis of the drill head; and the pressures of the cut therefore keep the disk cutters pressed toward the center of the drill structures and prevent them from being forced off from the ends of the shaft supports on which they are mounted. The thrust of the cut on the rearward following edge of the disk members further relieves these edges from any tendency to dig into the material under excessive pressure, and thus cause the drill head to "wabble" or even, at times, to bind itself in the hole that is being drilled. A further advantage of utilizing the rearward following edges of the disks as cutting members is that in such cases the material is sheared away by an upward rolling movement of the edge—as distinguished from a downward rolling movement of the forward advancing edge—and said material is thus discharged into the cavity being formed in better position to be subsequently acted upon by the water that is used to flush it away to the top of the hole. All of these advantageous features of operation—as well as others—which result from the utilization of the reaward following edges of the disk members as cutting faces, are characteristic of the various species and forms of the constructions illustrated and described in this application.

Referring now more particularly to the particular form of embodiment illustrated in Figs. 1 to 5 of the drawings: In this construction the shaft supports 5, 5', on which the disk members 6, 6, are rotatably mounted, are inclined at a small angle to the longitudinal axis of the drill head—as shown in vertical section of Fig. 1—and are slightly offset horizontally with respect to that vertical axis—as shown in plan view in Fig. 2—so that the forward advancing edges 7, 7, of the disk members of this construction—(and the peripheral faces back of these edges)—are entirely out of engagement with the adjacent wall of the bore hole. The outer faces of these disk members are recessed or dished as at 9 so as to form cutting edges 8, 8, that engage with the material at an angle of something less than 90 degrees; and the peripheral faces of the disk members, back of these edges, are backed off at such an angle as to prevent any portion of the said faces from rubbing or dragging against the wall of the cavity. In order to determine the proper curvature to be given these edges the cross sectional form of the cup-shaped bottom of the hole is first determined in the manner indicated in the diagram of Fig. 3. In this diagram the line 3, 3, indicates the axial line of rotation of the drill head; the line 4°, indicates the intersection of the plane of the cutting edge 8, 8, with the vertical plane through the cutter axis 5' (i. e., the plane of section at the right hand of Fig. 1); the quadrant, 8 a b . . . e (described about 4 as a center), represents the rearward cutting sector of this edge; and the corresponding curve, 8' a' b' . . . e' represents the elliptical projection of this sector on the vertical plane 3'—3' through the axis of rotation, 3, 3; the axis 5 of the cutting edge being offset from the axial line 3, 3, by the amount indicated in the plan view of Fig. 2. The radius of cut described by each point 8, a, b, c, etc., on the cutting edge is found by laying off point 4' 4' (on the axis 3, 3) whose vertical distances from the chords, 4 8', 4 a', 4 b', etc., are equal to the horizontal distances from the axis 3, 3, to the ends 4 of the corresponding chords; and joining the points 4' so laid off with the points 8' a' b' . . . e'. Then by laying off the distances 4', 8', 4' a', etc., on the prolongations of the horizontal chords, 4 8', 4 a', 4 b', etc., a series of points 8", a", b" . . . e" are obtained which determine the cross sectional outline of the cavity formed by the rotation of the inclined disk cutters 6, 6, on the axis 3, 3. The surface of revolution described by the advancing edges 7 of the disk members will be found in the same manner; and, in order to prevent any interference of this edge with the action of the opposite edge 8, the diameter 7—7, must be such that the surface of revolution of the advancing edge is everywhere within the surface of revolution described by the following edges, 8, 8. This limiting diameter of the advancing edge is determined by drawing the line 7 f to represent the intersection of the plane of the advancing edge 7 with the vertical plane through the disk axis; laying off the point 7" at a distance above the lines e e" equal to the horizontal distance (on e e") from the axis 3, 3, to the point f; drawing the line 7" g, equal in length to the radius of cut 3 e"; and then projecting the distance e' g, thus found, on the inclined chord f g'. The radius 7 g' will then be the maximum permissible radius of the advancing edge 7; and with an edge of this radius, the circle of revolution described by a point on its horizontal diameter will be found by joining the points 7' h' (laid off in the same manner as the corresponding points, 4' 8') and then laying off this distance 7' h', from the axial line 3, 3, on the prolongation of the horizontal chord 7 h'. Then the curve drawn through the points e" h"—(as indicated by a dotted line in the diagram of Fig. 3)—indicates the cross sectional form of the surface of revolution described by the advancing edge 7; and this is at all points within that described by the following edge 8.

When determined in this manner the diameter of the advancing edge 7 of the construction illustrated in Figs. 1 and 2, is such that the peripheral faces of the inclined disk members 6, 6, are in full contact with the bottom of the hole—as shown in Fig. 1—because at this sector of action horizontally opposite points on the two edges 7 and 8 of the said members are moving in substantially the same surface of revolution; while at points on their horizontal diameters—at or near the plane of maximum radius—there is a small amount of "clearance" between the peripheral faces of the disks, back of the cutting edges 8, and the walls of the bore cavity. This peculiar relationship between the different positions of the surfaces of the disks 6, 6, and the walls of the cavity cut thereby, constitutes another characteristic advantage of utilizing the rearward following edges—(instead of the forward advancing edges)—of the disk members as the cutting elements; because this full area of contact between the faces of the disks and the material at the very bottom of the hole—which is unattainable if the advancing edges of the disks are used as the cutting edges—not only affords a better support for the weight of the drill parts, but also tends to secure a more rapid and perfect pulverization or disintegration of any large particles of material that are sheared away by the cutting edges, and which must be necessarily reduced to a fine powder before they can be carried away in suspension by the flushing stream of water.

The shaft supports, 5, 5', of the disk members 6 are each formed with an integral head, 10, and are fitted tightly in holes cut at the proper angle, and in the proper offset relationship, in the lower end of the drill head. In the construction shown in Figs. 1, 2 and 5 the hole for the left hand shaft support—shown in full lines in Fig. 5—is bored completely through the head and the shaft support which is fitted therein is slotted to receive a tongue or tenon projection 11 on the opposing right hand shaft 5'; this tenon member 11 being also fitted into proper slots 12 and 13, that are cut in the solid metal of the head, 1, after the hole for the left hand support has been bored. The disk members 6, 6, are not carried directly on the outer ends of the shaft supports, but are mounted to revolve freely on shouldered sleeves or bushings, 14, 14, that are interposed between the inclined sides of the drill head, 1, and the integral heads, 10, 10, of the disk shafts, 5, 5; and washers 15, 15 are also preferably interposed between the outer recessed faces, 9, of the disk members and the heads 10, 10. When the parts are assembled they are bound tightly in place, without the use of any objectionable screws or nuts, by driving a pin 16,—preferably provided with a central conical portion 17—through holes, drilled transversely of the axes 5, 5, through the intersecting ends of the mortise and tenon elements of the shaft supports and the adjacent portions of the drill head. In order to hold the pin itself in place, the smaller end—projecting beyond the side of the drill head—may be bent over with a hammer or a nut 18 may be threaded thereon.

In the modification of the construction in Fig. 6, the shaft supports 5ª, 5ª, are provided with integral heads 10ª, 10ª, and are also provided with shoulders 9 that engage with the inclined sides of the drill head 1. In this case the holes which receive the shouldered portions of the shaft supports are bored—in the proper offset relationship illustrated in Fig. 2—from each side of the head and the parts are held in position by a single bolt 20 that passes straight through the two oppositely inclined shaft supports 5ª, 5ª. This bolt is threaded into the right hand shaft support and is held locked in position by a split coned lock nut 21, which engages with a smaller threaded end portion of the bolt 20; and the pitch of the threads on the two portions of the bolt are preferably, although not necessarily, different and reversed in direction. In this case the disk members are either mounted to revolve directly on the enlarged projecting portions of the shaft supports 5ª, 5ª—as shown at the right of Fig. 6—or are mounted on sleeves or bushings interposed between the disks and said supports (as shown at the left of that figure); washers 15ª, 15ª being used as before to separate the faces of the disks from the adjacent faces of the drill head 1 and the shaft heads 10ª, 10ª.

It will be noted also that the recess 9ª in the cutters of this modification, does not extend completely across the cutter but is formed adjacent the outer circumference of the cutter. It thus takes the form of a groove deepest near the periphery and sloping to the level face of the disk toward the center thereof. It is to be understood, however, that I do not limit myself to any particular type of recess but any of the various forms illustrated in the drawings, or other forms of a similar nature may be used without departing from the spirit of my invention.

Figs. 7 and 8 illustrate a second modification of the species of construction exemplified by the drill structures shown in Figs. 1 to 6. In this modification the two disk members 6ᵇ, 6ᵇ, are mounted in parallel relation to each other on the lower end of the drill head, 1; the shaft supports 5ᵇ, 5ᵇ, of the said members being, as before, slightly offset laterally with respect to each other as indicated in Fig. 8—so that only the rearward following outer edges, 8ᵇ, of the disks come into cutting engagement with the walls of the cup shaped end of the bore hole. In this construction the inner ends of the shaft supports 5ᵇ, 5ᵇ, are provided, one with a mortise, and the other with an interlocking tenon 11ᵇ, and the parts are locked in position on the drill head by providing the tenon member 11ᵇ with a bolt projection 20ᵇ, that enters a central hole in the head of the mortised shaft support, and is engaged by a split coned nut 21ᵇ.

In all of the constructions shown in these first eight figures of the drawings provision is made for the supply of lubricant to the shaft bearings for the rotating disk members;—and for the supply of currents of water to the cavity in which these disk members are operating—by the arrangement illustrated in section in Figs. 1 and 4. The drill head is provided with a central longitudinal cavity 22, which is open at its upper end to communicate directly with the hole in the hollow drill stem (that is secured to the threaded end 2 the drill head) and is in communication at its lower end—through branch passages 23, 23, etc.,—with the semi-shrouded disk receiving recesses at each side of the drill head. The central portion of this cavity 22 is closed off from the water passages by a sleeve or tube 24, that is closed in any suitable way at its upper end, and is charged with a suitable lubricant that is delivered to the disk bearings through a central hole 25, leading downward to the holes in which the shaft supports 5, 5', etc., are mounted, and thence through branch passages cut in the shaft supports themselves—as indicated, for example at the right of Fig. 1—to the bearing surfaces on which the disk members rotate. This last described construction affords a very simple and inexpensive means for providing for the necessary water and oil supply to the operating parts; and one advantage which it possesses is that when the parts are disassembled—for replacement of the disk members, for example—all of the oil passages are exposed and open for cleaning.

In the modifications shown in Figs. 1, 2 and 6 the inclination of the cutters is such that only a small uncut portion is left in the middle of the bottom of the hole. This portion is, however, gradually chipped away by the action of the adjacent cutters. In Fig. 7 where the cutters are vertical the central portion of the hole left uncut by the rotary cutters is somewhat larger and a central replaceable chisel or knife, 46, is provided which cuts away the center in an obvious manner.

The construction shown in Figs. 9 to 12—Sheet 2 of the drawings—constitutes a third modification of the first species of disk drill structure that embodies the present invention. In this construction—as in the last described construction of Figs. 7 and 8—the two disk members 6, 6, are mounted in parallel vertical relationship to each other, (Fig. 9) and in slightly offset horizontal relationship to each other as shown in Fig. 10. In this structure the drill head, 1, is forked or slotted at its lower end, and the disk members 6°, 6°, are mounted close to each other in the slot opening between the forks 26, 26. Both disk members are, in this case, supported on a single shaft 5—that is provided with the eccentrically turned portion 5$c'$ to carry the left hand disk member in the proper offset relationship to the right hand disk member—and this shaft is held in position in the forked head by the coned nut 21$c$ engaging with the threaded end portion 20$c$ of the said shaft. In order to prevent this nut from unscrewing, when the drill is in operation, the coned cavity in which it engages is provided with a series of slightly undercut notches 27, 27, etc., which may be conveniently formed by drilling shallow holes at a slight angle to the face of the cavity as shown in Fig. 13; and when the nut is screwed home the space between its hexagon head and the notched groove surrounding it is filled with lead or Babbitt metal that is hammered or cast in place. When it is desired to remove the shaft support 5 the soft metal around the nut head is melted out—as by the direct local application of the heat of an ordinary gasolene blowpipe torch—or chiseled out sufficiently to permit the nut 21$c$ to be unscrewed. This very simple and easily applied means of locking the nut 21$c$ in place can be applied also to the construction shown in Figs. 6 and 7, and it affords an effectual and reliable means for preventing the accidental loss of the parts in the well during the drilling or the "pulling" operations.

In the construction of Figs. 9 and 10, each of the disk members 6°, 6°, is provided with sleeves or bushings 15$c'$, 15$c'$, that may be mounted tightly in the disks, and arranged to revolve freely on the shaft bearings 5$c$ and 5$c'$; or may be so mounted as to be free to rotate either on the shaft bearings or in the disks. Washers 15$c$, 15$c$, are interposed, as before, between the recessed faces 9$c$, 9$c$, of the disks and the adjacent faces of the drill head support; and another fixed washer 28—shown separately in side view in Fig. 12—is interposed between the inner adjacent faces of the disk sleeves 15$c'$, 15$c'$. This washer 28 is preferably mounted on a separately turned section of the disk shaft, intermediate the bearing sections 5$c$, 5$c'$, but is prevented from revolving thereon by a stem portion 29 which projects upwardly into the opening 25$c$ at the lower end of the lubricator sleeve 24$c$. In order to reduce the frictional resistance between the bearing faces of this washer and of the disk sleeves 15$c'$, 15$c'$, the washer 28 may be provided with a number of cells 30, 30, etc., for the reception and retention of a corresponding number of hardened steel balls or rollers; and provision is made, as before, for the constant supply of lubricant to the bearing surfaces through the passage ways leading from the lubricator 2,4$c$ through the washer 28, to the shaft 5$c$—5$c$ and the disk sleeves 15$c'$.

The cross sectional form of the cavity cut by the rotating and revolving disks of Figs. 9-10 construction is plotted in the right hand portion of the diagram of Fig. 11; in which, 3—3, indicates, as before, the longitudinal axis of rotation of the head; the quadrant 8 $a\ b\ \ldots\ e$, described on 5 as a center, represents the sector of the rearward following edge 8$c$ of one disk member (which is offset by the amount shown from the central axis of rotation); the line 5—4' indicates the distance from the center of the head to the plane of the cutting edge, 8$c$,—8$c$; and the lines 4' 8, 4' $a'$, 4' $b'$, 4' $c'$ ... 4' $e'$— (drawn from the point 4' to the projections of the points $a.\ b.\ c\ldots e$ on the line 5—8)— represent the radii of the circles described by the points, 8 $a\ b\ \ldots e$ on the cutting edge as the drill head revolves. Then laying off these distances, 4' 8, 4' $a\ \ldots$ 4' $e'$ on the prolongations of the horizontal chords, 5—8, 4 $a$, 4 $b\ \ldots\ e$, a series of points 8'', $a''$, $b''$, $c''\ \ldots\ e''$ are obtained which define the genatrix of the surface of revolution described by the revolution of the cutting edges on the axis 3—3. In order to determine the limiting radius of the forward advancing edges 7$c$, 7$c$, of the disk members, a point 7' (indicated by the numeral at the right of the line 3—3) is laid off at a distance above the horizontal diameter, 5—8, which is equal to the distance from the axis of revolution to the plane of this edge; a line 7' g, equal in length to the line 3 e'', is drawn; and the point g is projected, at g', on the chord e e''. Then the radius 5 g' is the maximum radius which can be given to the advancing edge 7ᶜ, because that is the radius which will cause the point g' on the said edge to describe the same circle of movement as is described by the horizontally opposite point on the cutting edge 8ᶜ. With an advancing edge of this radius 5 g' the circle described by the point h on the advancing edge—opposite the point 8 on the cutting edge—will pass through the point h'' (determined as before) which will be just inside the point 8''; and in such case the surface or revolution described by the advancing edges of the disks will be everywhere within the surface of cut described by the following edges of those disks.

It will be noted that in the construction last described the clearance between the peripheral faces (back of the cutting edges) of the disks and the surface of the cut is very much smaller than in the construction illustrated in Figs. 1 to 6. This clearance may be eliminated entirely by laying off the radii of the opposite edges of the disk members in the manner indicated in the left hand portion of the diagram of Fig. 11; where the genatrix 8'' a'' b'' ... e'' of the surface of revolution of the following edges 8ᶜ of the disk members are first determined as before; and the radius 7' h'—indicated by the dotted line 7' h' at the left hand side of the diagram—is then chosen which will make the point h'' coincide with the point 8''. In this case the points 8 and 7 on the horizontal diameters of the disk members travel in the same path and both edges of the said disk members may then be utilized as cutting elements. This feature of functional construction constitutes the particular characteristic of the second species of disk drill structure described in this application; and various illustrative forms of drill bits embodying this subsidiary characteristic—together with the general features of improvement heretofore enumerated—are shown in Figs. 14 to 21 next to be considered.

In this construction shown in Fig. 14 the two disk members 6ᵈ, 6ᵈ, are mounted in a slot opening between the downwardly projecting legs 26, 26 of the drill head—the arrangement being, in these respects the same as in the construction of Figs. 9 and 10. But in the construction of Fig. 14 the axes of rotation of the two disks are coincident; that is to say neither disk is offset laterally with respect to the central axis of rotation of the drill head; and the radii of the opposing edges 7ᵈ and 8ᵈ of these disks are determined in the manner indicated in the closing portion of the last paragraph. In this case, therefore, both the following edges 8ᵈ, 8ᵈ, and the advancing edges 7ᵈ, 7ᵈ, of the disk members engage with the wall of the cavity in which the drill is operating and act as cutting elements to shear away the material from that wall. An examination of the left hand portion of the diagram of Fig. 11, which corresponds in dimensions to the construction of Fig. 14—shows that the surfaces of revolution of the edges 8ᵈ and the edges 7ᵈ practically coincide between the points 8'' and d'' of the diagram; but that below the point d'' the points on the advancing edges 7ᵈ cut circles of slightly larger radii than are described by horizontally opposite points on the following edges 8ᵈ, 8ᵈ. At the extreme bottom of the hole, therefore, the surface of the cut will be established by the action of the advancing edges alone; but at all points above this extreme bottom portion the two opposing edges of the disk parts will coöperate in penetrating and shearing away the material.

In the construction now under consideration the shaft member 5ᵈ on which the disk members 6ᵈ, 6ᵈ are mounted is straight and of uniform diameter from end to end; and the disk members are mounted to revolve on a single common sleeve 15ᵈ'; the inner faces of the disk being separated as before by a washer 28ᵈ that is held from turning on the sleeve 15ᵈ', by an upwardly extending stem 29 (here indicated in dotted lines) that engage with the lower end of the lubricator tube 25 in the manner illustrated in Fig. 9. The shaft support 5ᵈ is held in position in the legs 26 by slotting the end of the shaft in the manner indicated in Fig. 14 and filling the space between these slots and corresponding slots cut in the legs 26, with fusible material similar to that used in filling the slots 27 of the previously described construction.

It is obvious that in both the constructions last described—that of Figs. 9–10 and of Fig. 14—the sleeve members 15ᵈ' and the central washer 28 may be made integral with each other, instead of being made in separate parts.

In the construction shown in Figs. 16, 17, and 18 (Sheet 3 of the drawings) the two disk members 6ᵉ, 6ᵉ, are mounted on each side of the drill head in a manner similar to that shown in Fig. 7 construction. But in this case—as in the construction of Fig. 14— the two disk members are supported on a common axis in such manner that both the following edges 8ᵉ, 8ᵉ, and the advancing edges 7ᵉ 7ᵉ, of the disks engage with the surfaces of the bore hole. In this case the common shaft support 5ᵉ of the disk members is secured in the head, 1, by means of a cross pin 31 that is held in place by means of a screw 32. The left hand disk member is held in place against its washer 15ᵉ by means of the head 10ᵉ, on the shaft 5ᵉ; and the right hand disk member is held in place by means of a nut 21 that is threaded on the reduced portion 20ᵉ of the shaft 5ᵉ; and is prevented from unscrewing by means of a reversely threaded lock screw 33. The lubricant for the bearing surfaces is carried from the lubricator not shown (which is, in this case, screwed into a threaded opening 24ᵉ in the top of the drill head) through a passage way 25ᵉ to the center of the shaft 5ᵉ and thence through branch passages indicated in dotted lines in Figs. 16 and 17) to the bearing surfaces of the sleeves 15ᵉ′; and the water is discharged into the cavity surrounding the drill head through separately drilled passages 23ᵉ that communicate with the interior of the drill stem that is screwed to the upper end of the drill head 1. In Fig. 19 is shown a modified form of cutting disk used in this head on which the cutting edges are beveled to produce a less acute but toothed cutting portion.

In the construction shown in Figs. 20 and 21 (Sheet 4 of the drawings) the disk members 6ᶠ, 6ᶠ, are mounted in a slot between the legs 26ᶠ, 26ᶠ, of the drill head; and in this case these disk members are inclined toward each other. Each member may be provided, as before, with bearing sleeves 15ᶠ′ (as shown in Fig. 21); and each is mounted on its own individual shaft support 5ᶠ; the inner faces of the members being separated and spaced apart by a wedge shaped washer 28ᶠ. The parts are held in their assembled position in the head by means of a bolt 20ᶠ that is threaded into the right hand shaft support 5ᶠ; and after the parts are drawn tightly into position, by screwing home this bolt, the projecting end thereof is headed over to prevent its accidental loosening. When it is desired to remove the parts the headed over portion is cut away with a file or cold chisel, and when the parts are reassembled again a new bolt is, if necessary, used for again securing them in place in the manner just described. In this construction the stream of flushing water is supplied through a single central tube 35 which leads from the top of the drill head to the slot in which the disk members are housed and partially shrouded. A pocket for containing the lubricant is formed around this central tube, and passage ways 25ᶠ lead from the lower end of this pocket to corresponding passage ways formed in the shaft supports 5ᶠ and communicating, at proper points with the bearing surface of the sleeves 15ᶠ′. This lubricant pocket is closed at the top with a suitable screw cap 36, which is preferably threaded on the tube 35, although it may be threaded into the upper end of the lubricant pocket.

The disk members 6ᶠ, 6ᶠ, of the construction last described may be formed solid; or, as indicated in the plan view of Fig. 21, they may be made each in two parts; each of which is capable of revolving independently on the shaft support 5ᶠ, or on the bearing sleeve support 15ᶠ. In this case the rolling movement of the inner parts, which carry the advancing edges 7ᶠ, 7ᶠ, may be slightly different from the rolling movement of the outer parts which carry the following edges 8ᶠ, 8ᶠ; and, as a result of this differential movement—which is produced by the engagement of the peripheral faces of the parts with the bottom of the bore hole at different distances from the axis of rotation—a more effective cutting action of the independently moving edges, and a more effective crushing action of the peripheral faces between those edges, may, under certain conditions, be secured.

The construction shown in Fig. 23 is a further development of what may be termed the divided disk construction of Fig. 21. In the Fig. 23 construction the two inner portions of the disk members—which carry the advancing edges 7ᵍ, 7ᵍ,—are mounted in vertical parallelism with each other and with the axis 3, 3, of the drill head; these two members being supported in axial alinement on a common washer 28ᵍ, and this washer being prevented from rotation by a stem 29ᵍ that extends upwardly and into the opening at the lower end of the lubricating chamber 22ᵍ. The outer parts of the disk members which carry the following edges 8ᵍ, 8ᵍ, are mounted at a slight vertical angle to the inner parts carrying the edges 7ᵍ, 7ᵍ; and these outer parts are supported each on its own bushing sleeve 15ᵍ′ that is carried, in turn, on the inclined disk shaft 5ᵍ. The outer ends of these disk shafts 5ᵍ are provided with heads 10ᵍ which engage with recesses in the forks 26 of the drill head 1; and the inner ends of the said shaft members are provided with portions of reduced diameter which engage with the ends of the bushings 15ᵍ′ and the holes in the central washer 28ᵍ which register therewith. The parts are all secured in position, in and between the forks of the head, by means of a bolt 20ᵍ which is threaded into the right hand shaft support 5ᵍ and is provided at its threaded end with a series of slots 37ᵍ. The outer end of the right hand shaft member 5ᵍ is recessed, and the said recess is provided with slots 27ᵍ; and when the bolt 20ᵍ has been screwed home the space between its slotted end and the slotted recess just described is filled with lead or Babbitt metal, thereby locking the bolt against unscrewing when the drill is in operation.

The division of the disk members into parts—one of which is provided with a following cutting edge, and the other of which is provided with an advancing cutting edge—permits these parts to be not only separated circumferentially and axially (as shown respectively in Figs. 21 and 23), but also permits them to be axially offset with respect to each other, so that the front peripheral face of the part carrying the following cutting edge 8 and the rear peripheral face of the part carrying the advancing cutting edge 7, may both clear the adjacent walls of the bore cavity. We thus obtain a construction which consists essentially of a combination of axially offset disk members provided with following cutting edges—as shown in the first thirteen figures of the drawings—with coöperating oppositely offset disk members having advancing cutting edges, this latter set of members being arranged in substantially the same manner with respect to the drill axis as they are arranged in ordinary disk drill construction. The structures thus obtained constitute a third species of construction which embodies the main characteristic features of the invention forming the subject matter of this application. Different forms of this third species of construction are illustrated in Figs. 25 to 33 (Sheet 5) of the drawings.

In the construction illustrated in Figs. 25, 26 and 27 the two parts of each disk member are mounted on shaft supports $5^h$, $5^h$, in such manner that the parts carrying the following edges $8^h$ are laterally offset and revolve eccentrically with respect to the parts carrying the advancing edges $7^h$, $7^h$, and these parts are further so arranged—as shown in plan view of Fig. 26—that the planes of the two sets of cutting edges are coincident, this result being obtained by placing the members having the following cutting edges inside of the parts carrying the advancing cutting edges. In this case the disk shaft supports $5^h$, $5^h$, are formed integral with, or are mechanically attached to, the outer members $1^h$, $1^h$, of a split drill head; and the inner ends—which are shouldered to overlap each other—engage with the central member, $1^{h'}$, of the said head. When the parts are assembled in position, the head sections, and the shaft sections carrying the disk members, are locked in position in part by the drill stem collar $2^h$, in part by the collar 40, and in part by the bolt $20^h$. In order to provide a suitable chamber for the lubricant the central member, $1^h$, of the head is forked at its upper end to leave a central opening $22^h$ and this opening is closed at the top by a short section of pipe $24^h$ which extends up into the hollow drill stem and is provided at its end with a suitable cap. The flushing water is carried from the hollow drill stem to the slotted openings in which the disk parts are located by suitable passage ways $23^h$ that are formed in the sides of the drill head parts $1^h$, $1^h$.

In the construction illustrated in plan view of Fig. 28, the two portions of each disk member—one of which carries the advancing cutting edge $7^k$, and the other of which carries the following cutting edge $8^k$—are mounted on eccentrically turned portions of shaft supports $5^k$, $5^k$, that are either formed integral with the lower end of the drill head $1^k$ or are formed on opposite ends of a common shaft (indicated by full lines in Fig. 28) that is secured permanently in the drill head. The disk member parts are held in position on the free ends of the shaft supports by means of threaded sleeves 41 that engage with the outer eccentric portions of the said projecting shaft supports. The bearing surfaces for the parts of the disk members are supplied, as before, with lubricant through a central opening $25^k$ (that leads upward to the lubricant chamber), which communicates by means of suitable passage ways with said bearing surfaces. The threaded sleeves 41 are provided with suitable perforations 42 that are eccentrically located with respect to the ends of the longitudinal passage way through the disk shaft supports; and when these sleeves 41 are screwed in place against the bearing sleeves $15^{k'}$ they are locked in position by filling the central openings 42 and the eccentrically located ends of the before-mentioned passageway with lead or Babbitt metal. In order to remove these sleeves it is only necessary to melt out this fusible material by means of the locally applied heat of a gasolene torch or other suitable heating device.

In the construction last described the disk parts carrying the following edges $8^k$, $8^k$, are not only offset horizontally with respect to each other—by the amount indicated in the plan view of Fig. 28—but are also offset vertically with respect to each other by the amount indicated in Fig. 30 which is a sectional end view taken adjacent the outer end of the eccentric portions of the shaft $5^k$ on which the bearing sleeves $15^k$ and 41 are mounted the position of the center $5'$ of Fig. 29 being indicated at $5'^k$ in Fig. 30. This double offsetting is resorted to in order to obtain the most effective coöperation between the advancing cutting edges $7^k$, $7^k$, and the following cutting edges $8^k$, $8^k$; and the amount of vertical offsetting is determined in the manner indicated in the diagram of Fig. 29. In this diagram the points $8'' a'' b'' c'' d'' e''$ are the points which determine the genatrix of the surface of revolution described by one of the advancing edges $7^k$ about the central axis of rotation of the drill head. The partial circles of the upper left hand part of the diagram are those described by the points $8''$, $a''$, $b''$, $c''$ and $d''$ as they revolve to generate the surface of the cut. These circles intersect the plane of the cutting edges $8^k$, $8^k$, on the correspondingly designated line of the diagram, the said line being offset from the line 5, 8″ by an amount equal to the distance between the axial line of rotation of the drill head and the plane of one of the following cutting edges. The distances from the central line 3, 3, to the intersection of each circle with the line 8, 8, are the chords of the curve $m''$, $n''$, $o''$, $p''$, which represent the intersection of the vertical plane $8^k$, $8^k$, with the surface of the cut described by the advancing cutting edge; and when this curve is thus determined it is an easy matter to find a center 5′ on which a circle of the desired radius for the following cutting edge $8^k$ can be drawn, that will most nearly coincide with the said curve $m'' \ldots p''$. The point 5′ thus found determines the axial line of the shaft support for the part of the disk member that carries the following cutting edge $8^k$; and as shown in the diagram of Fig. 29, and also as shown in the end view of Fig. 30, this center of the following cutting edge is slightly offset vertically with respect to the center of the advancing cutting edge.

The construction of Fig. 33 illustrates a second modification of the construction shown in Figs. 25 and 26. In this modification the disk member parts which carry the following cutting edges are arranged in vertical parallelism with respect to each other, and are mounted to rotate on a common central sleeve $28^1$ that is provided at its opposite ends with properly offset eccentric bearing surfaces for the said parts. The disk parts which carry the advancing cutting edges $7^1$, $7^1$, are also arranged in vertical parallelism with respect to each other, but these parts are inclined slightly to the parts carrying the following cutting edges $8^1$, $8^1$. The bearing sleeve $28^1$ for the first set of parts and the bearing sleeves $15^{1\prime}$, $15^{1\prime}$, for the second set of parts, are carried on two shaft supports $5^1$, $5^1$, that are preferably centrally arranged with respect to the bearing sleeves $15^{1\prime}$, $15^{1\prime}$ and are preferably provided with reduced ends which enter eccentrically formed openings in the central sleeve $28^1$; and the parts are held in assembled position with respect to each other by providing one of these shaft supports with a prolongation $20^1$, and centrally threading the other shaft support to engage with this projecting portion $20^1$. In this case the drill head is of the general form indicated in vertical section in Fig. 9; that is to say, it is a drill head provided with two downwardly projecting legs between which the disk members are housed on their shaft and bearing sleeve supports.

In all of the above described constructions the disk members are so recessed or shaped on one of their faces as to present sharp cutting edges on the rearward following side of the disk. As already pointed out this side is moved upwardly with respect to the wall of the cup shaped cavity in which the drill is operating; the rotation of the disk members on their axes being effected by the rolling engagement of their peripheral faces with the bottom of the hole. These peripheral faces themselves are preferably curved to correspond as closely as possible to the curvature of the wall of the cavity—that is to say that they are formed with as little clearance or "backrake" as possible—in order to secure the most effective backing of the cutting edge, and thereby prevent any rapid wearing away of the edge itself. These peripheral faces themselves may be of varying surface configuration; that is to say they may be left plain, as indicated in Figs. 2, 14, 25 and 26; or they may be provided with teeth, as indicated in Figs. 1, 7, 9, 16, 17, 19, 20, 23, 28 and 33. It is generally advantageous to make the said surfaces with a toothed outline; and in such case the teeth are preferably inclined in such manner that the thrust of the cut tends to revolve the disk members in the same direction in which they roll on the bottom of the hole as the drill head revolves. Where the members are provided only with following cutting edges the teeth are therefore inclined downwardly and backwardly from the cutting edge, as shown, for example, in the left hand portions of Fig. 1 and Fig. 9. When the disk parts are so shaped as to present both a following cutting edge and an advancing cutting edge the teeth are arranged on the peripheral faces in oppositely disposed spirals as shown in Figs. 15, 16, 20, 23, and 31. This arrangement of teeth upon the periphery of the cutter, whereby the teeth are cut parallel and inclined outwardly and either upwardly or downwardly from a median line, is termed a herring-bone construction. In this case the thrust of the cut on the teeth adjacent to the following cutting edge tends to cause an upward movement of that edge and the thrust of the cut on teeth adjacent to the advancing edge tends to cause that edge to move downwardly—both sections tending to produce the same counter-clockwise rotation of the disk as results from the following engagement of the latter with the material at the bottom of the hole. This last construction of the toothed peripheral faces is subject to various modification; for example, the oppositely inclined teeth may intersect each other at any point on the peripheral surface of the disk—as indicated in Fig. 15, or in the left hand portion of Fig. 16—or they may run from the cutting edge to central grooves—as indicated in the right hand portion of Fig. 16, or in the plan view of Fig. 17—or they may extend back from each cutting edge only a short distance—as indicated in Fig. 7 and Fig. 19—the central portion of the peripheral surface being formed with teeth extending straight across that portion, as indicated in the last mentioned figures. Where the following cutting edges and the advancing cutting edges are formed on separate parts of the disk members, the teeth on each of the said parts are preferably formed at the desired spiral across the entire peripheral face of each part, as is shown, for example, in Figs. 20, 23, 31, and 32; or they may be formed across the entire face of one part and only across a portion of the face of the other part, as shown for example on Fig. 28. The cross-sectional form of the teeth themselves may also be varied according to the varying conditions of operation; that is to say, they may be formed with the two sides of the tooth inclined at the same angle to the peripheral face (as in Fig. 32) or they may be formed with two sides inclined at different angles (as shown in Fig. 31). The sharpest cutting action—and the greatest tendency of the cutting action to produce rotation—is, in general, secured by forming the teeth in the manner indicated in Fig. 31, where the teeth on the following cutting edge 8 have radially cut faces on the under side, and where the teeth on the advancing cutting edge 7 have radially cut faces on the upper side—these radially cut faces being, in each case, the ones which first come into engagement with the material to be removed from the wall of the bore hole.

It will be apparent from the descriptions of the various constructions above described that the characteristic features of the invention may be embodied in many different forms of structure. These characteristic features result primarily from the utilization of a cutting edge on the rearward following side of the disk members, either by itself, or in conjunction with the usual cutting edges on the forward advancing sides of such disk members. Other features of improvement which result from the various illustrated arrangements of the disk parts on the drill head, from the shaping of the peripheral faces of the said parts in the manner above described and from the different means disclosed for locking the elements together will be apparent to those skilled in the art without further explanation. This drill is efficient in operation and durable in structure, and has many advantages over the ordinary disk bit now in use.

Having thus described my invention, what I claim as new and desire to protect by Letters Patent is:

1. In a rotary boring tool, the combination with a rotatable drill head of a disk member mounted on an axis transverse to the axis of rotation of the head, and recessed on its outer side to form a cutting edge of less diameter than the inner side thereof, thus conforming to the curvature of the hole being drilled substantially as described.

2. In a rotary disk drill, the combination of a drill head and two disk members symmetrically mounted thereon on axes transverse to the longitudinal axis of the head, the said disk members being provided with sharp cutting edges on the outer faces which engage with the material on the rearward following sides of the members, and also provided with relatively broad crushing faces, back of said edges, which are shaped to conform to the surface cut by the said rearward following edges.

3. In a rotary boring drill, the combination of a head, and two cutting disks symmetrically mounted thereon on axes transverse to the longitudinal axis of the head, said cutters being flat on the advancing face, and recessed on the other face to form a sharp peripheral cutting edge thereon, and a crushing surface back of said peripheral edge shaped to conform to the shape of the hole.

4. In a rotary disk drill, the combination of a drill head secured to a rotatable drill stem, and two symmetrically positioned disk members mounted on axes transverse to the axis of the drill head, each of said disk members presenting a rearward following edge, that shears away the material from the end of the bore hole, and a comparatively broad crushing surface to disintegrate and pulverize the material thus sheared away, said crushing surface being shaped to conform to the curved walls of the hole.

5. A cutter for a rotary boring drill comprising a rotatable disk having a flat inner face and a dished outer face with sharp cutting edges on the circumference of both faces and a peripheral grinding surface shaped to conform approximately to the side wall of the hole.

6. A cutter for a rotary drill comprising a rotatable disk having a flat inner face, a recessed outer face providing a sharp cutting edge thereon and a toothed periphery shaped to conform to the side wall of the hole.

7. A cutter for a rotary drill comprising a rotatable disk having a flat inner face, a recessed outer face forming a cutting edge thereon and a toothed periphery, the teeth thereon being inclined backwardly and downwardly from the rearward following side of the cutter.

8. A cutter for a rotary boring drill comprising a rotatable disk having cutting edges on both sides thereof, a peripheral crushing surface shaped to conform to the side wall of the hole and provided with teeth inclined downwardly and backwardly from the rearward following edge thereof, said rearward edge being thus adapted to perform a larger part of the cutting operation.

9. In a rotary boring drill, the combination of a head, and disk-shaped cutters mounted thereon on axes transverse to the longitudinal axis of the head, the said cutters having peripheral cutting edges on the outer faces thereof which engage with the material on the rearward following sides of the cutters, and the said cutters being also provided with a comparatively broad peripheral crushing surface with teeth on said crushing surface so arranged as to assist the rotation of the cutter.

10. In a rotary boring drill, the combination of a head, and disk shaped cutters mounted thereon on axes transverse to the longitudinal axis of the head, the said cutters having peripheral cutting edges on the outer faces thereof which engage with the material on the rearward following sides of the cutters, and being also provided with comparatively broad peripheral crushing surfaces, having teeth thereon which are inclined downwardly and backwardly from the rearward following edge and backwardly and upwardly from the forward advancing edge of each cutter.

11. In a rotary boring drill, the combination of a head, and disk-shaped cutters mounted thereon on axes transverse to the longitudinal axis of the head, the said cutters being offset from said longitudinal axis to bring the rearward following edges in cutting contact with the material being drilled.

12. In a rotary boring drill, the combination of a head, and upright cutting disks mounted thereon on axes offset from the longitudinal axis of the head in such manner that the rearward following edges are presented in contact with the material being drilled, the said disks being recessed on the outer cutting side and flat on the other sides.

13. In a rotary boring drill, the combination of a head, and two disk-shaped cutters mounted on the base thereof, the said cutters being mounted on axes that are offset from the longitudinal axis of the head to bring the rearward following edges in contact with the material being drilled and are inclined to bring the peripheral surfaces in full contact both with the side and bottom of the hole.

14. In a rotary boring drill, the combination of a head, and two disk-shaped cutters mounted on the base thereof, the said cutters being mounted on axes offset from the longitudinal axis of the head to present the rearward following edges in contact with the material being drilled, and the peripheral cutting faces being toothed in such manner as to assist in the rotation of the cutters.

15. In a rotary boring drill, the combination of a head, and two disk-shaped cutters mounted on the base thereof, the said cutters being mounted on axes offset from the longitudinal axis of the head to present the rearward following edges in contact with the material being drilled, and each cutter being recessed on its outer face to provide a sharp cutting edge thereon, the periphery of the cutter being toothed in such manner as to assist in the rotation thereof.

16. A rotary boring drill comprising a head, and disk-shaped cutters mounted thereon on axes offset from the longitudinal axis of the head to present the rearward following edges in contact with the material being drilled, the outer faces of the cutters being recessed to provide sharp cutting edges thereon, and the periphery of the cutters being toothed and shaped to conform to the curvature of the hole.

17. A rotary boring drill comprising a head, and two cutting disks mounted on the forward end thereof on axes offset from the longitudinal axis of the head so as to present the rearward following edges in contact with the material being drilled, the peripheral grinding surfaces thereon being shaped to conform to the curvature of the hole.

18. A rotary boring drill comprising a head, and cutting disks mounted on the forward end thereof on axes offset from the longitudinal axis of the head so as to bring the rearward cutting edges into contact with the material being drilled, and the peripheral faces of the cutters being shaped to conform to the curvature of the hole.

19. A rotary boring drill comprising a head, with two opposite cutting disks mounted on the forward end thereof on axes transverse to the longitudinal axis of the head, the outer faces of said cutters being recessed to provide sharp cutting edges thereon, and the periphery of the cutters being toothed and shaped to conform to the curvature of the hole.

20. In a rotary boring drill, the combination of a head, opposite cuttings disks mounted on the forward end thereof, the periphery of said disks being shaped to conform to the curvature of the hole and being provided with herringbone-shaped teeth that are inclined downwardly from the rearward following edges and upwardly from the forward advancing edges of the cutters.

In testimony whereof, I hereunto affix my signature, this the 24th day of May, A. D., 1919.

FRANK L. O. WADSWORTH.